Nov. 29, 1955

H. E. GRIESEMER 2,725,081

WELDED WIRE MESH FABRICATING MACHINE

Filed Dec. 26, 1951

Inventor:
Harry E. Griesemer
by Hill, Sherman, Meroni, Gross & Simpson Att'ys

Nov. 29, 1955  H. E. GRIESEMER  2,725,081
WELDED WIRE MESH FABRICATING MACHINE
Filed Dec. 26, 1951  4 Sheets-Sheet 2
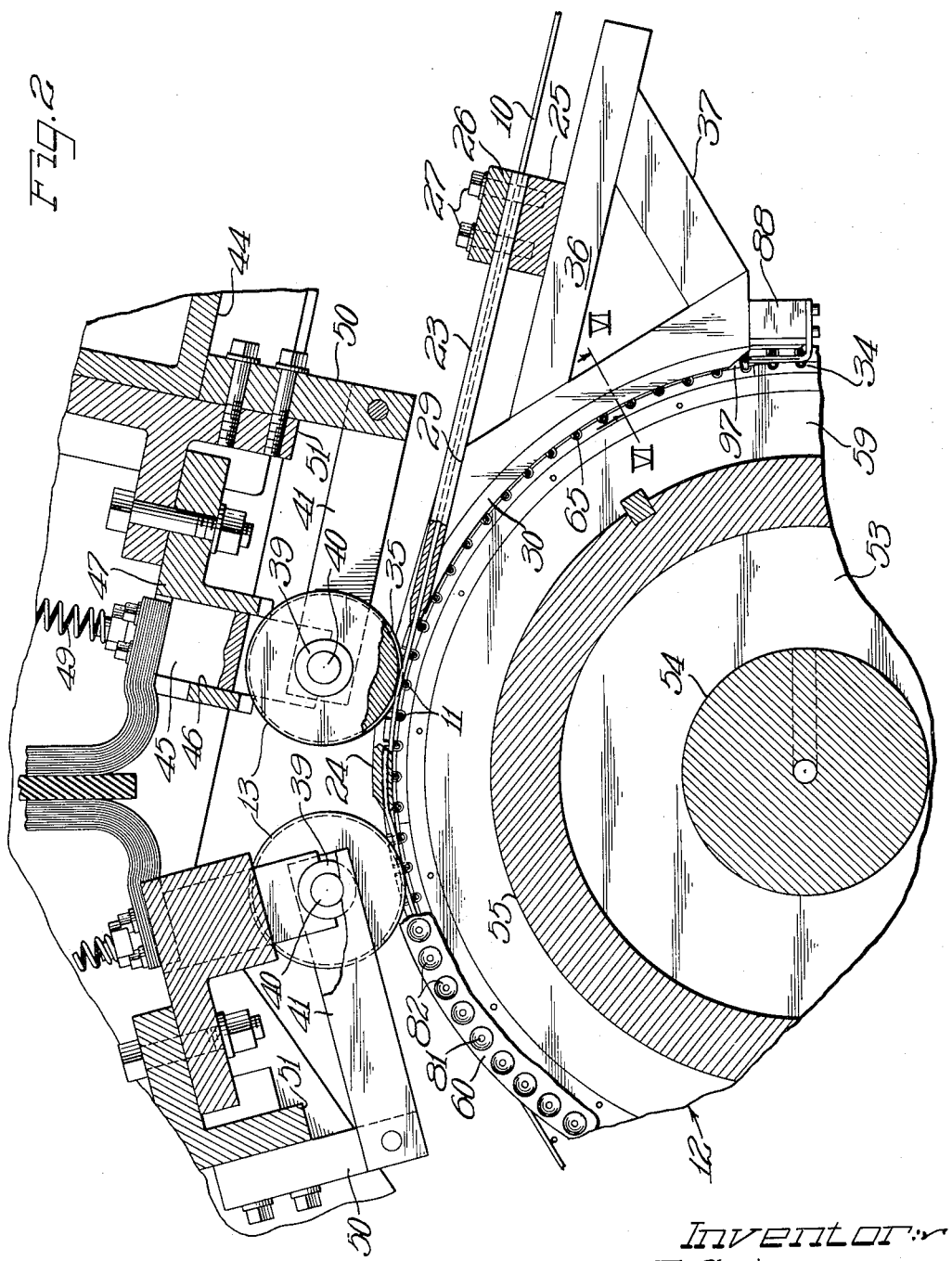
Inventor
Harry E. Griesemer
by [signature] Attys

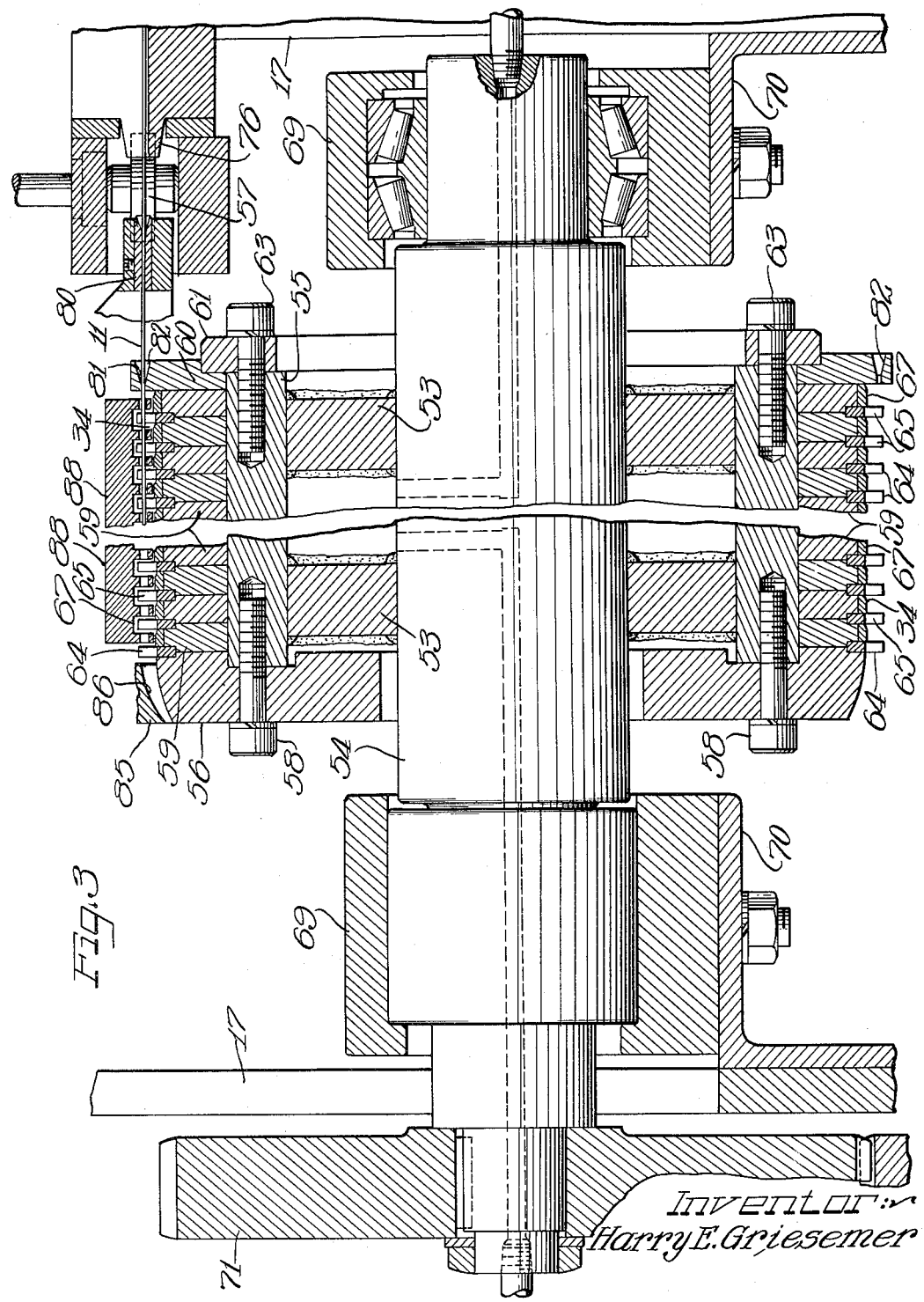

Nov. 29, 1955 H. E. GRIESEMER 2,725,081
WELDED WIRE MESH FABRICATING MACHINE
Filed Dec. 26, 1951 4 Sheets-Sheet 4
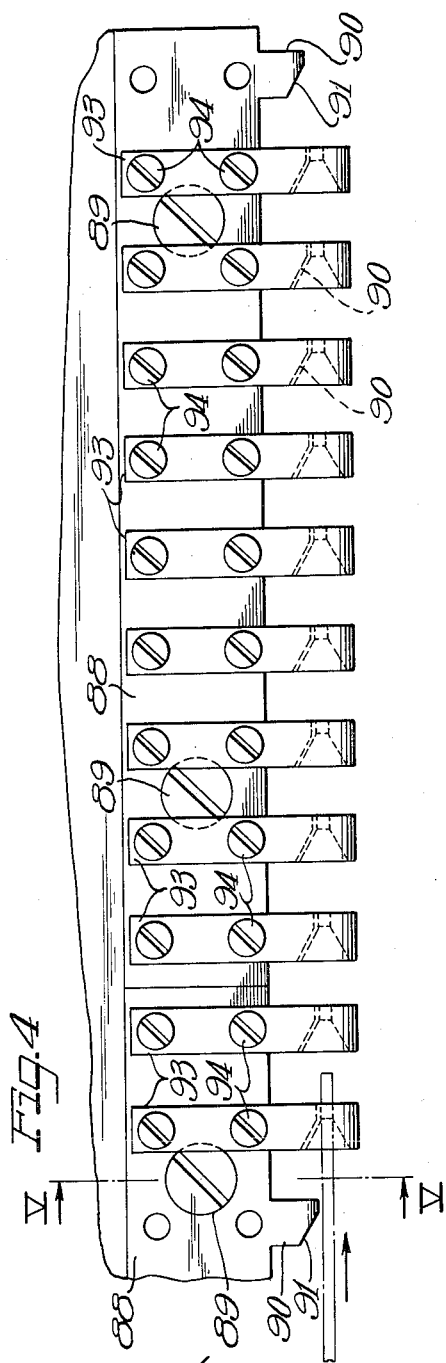
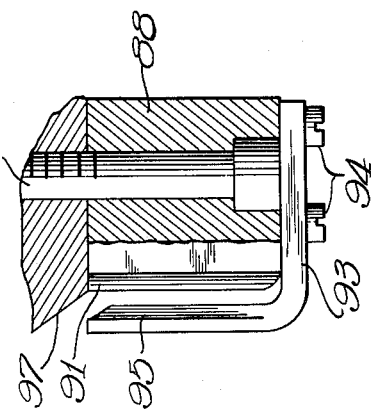
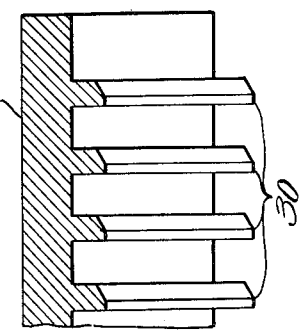
Inventor:
Harry E. Griesemer
by Attys

United States Patent Office 2,725,081
Patented Nov. 29, 1955

2,725,081

WELDED WIRE MESH FABRICATING MACHINE

Harry E. Griesemer, Bloomington, Ill., assignor to Northwestern Steel & Wire Company, Sterling, Ill., a corporation of Illinois Application December 26, 1951, Serial No. 263,285

7 Claims. (Cl. 140—112)

This invention relates to improvements in machines for fabricating welded wire mesh and more particularly relates to the welding magazine and guide means for guiding and retaining the stay wires on the magazine prior to engagement with the line wires.

A principal object of my invention is to provide a new and improved means for feeding and retaining the stay wires on a rotating welding magazine, prior to welding thereof to the line wires.

Another object of my invention is to provide an improved form of guide and retaining means for guiding and retaining the stay wires of a wire mesh in the stay wire slots of a rotating welding magazine, together with means for arresting travel of the stay wires and preventing the stay wires from rebounding from the welding magazine.

A still further object of my invention is to provide an improved form of welded wire mesh fabricating machine comprising a continuously rotating magazine storing a plurality of stay wires and successively bringing the stay wires into position to be engaged by the line wires of the mesh, together with a simple and improved form of mechanism for continuously supplying the stay wires to the magazine and retaining them thereon for contact with the line wires without interruption in rotation of the magazine.

A still further object of my invention is to provide a machine for fabricating wire mesh, comprising a plurality of uniformly spaced stay wires having a plurality of parallel spaced line wires welded thereto, consisting of a continuously rotating stay wire welding magazine, with feeding means continuously supplying the stay wires to the magazine, together with retaining fingers in alignment with the feeding means for guiding and retaining the stay wires to the magazine and initially retaining them therein.

A further object of my invention is to provide a guide means for the stay wires of a wire mesh fabricating machine including a revolving magazine having intersecting stay and line wire slots and rolling electrodes extending within the line wire slots for holding the line wires to the stay wires and welding the line wires thereto in a continuous operation, and including guide ribs extending within the line wire slots of the magazine in direct alignment with the mechanism for feeding the stay wires thereto, and retaining fingers extending in parallel relation with respect to the ribs within the line wire slots and initially retaining the stay wires to the magazine in radially spaced relation with respect to the bottoms of the stay wire slots.

A still further object of my invention is to provide a welded wire mesh fabricating machine comprising a rotatable stay wire magazine having a plurality of transverse stay wire slots open to the periphery and ends thereof and intersecting circumferential slots extending therearound, with means for successively feeding the stay wires to the stay wire slots at one end of said magazine and means at the other end of said magazine for arresting travel of the stay wires and preventing the stay wires from rebounding from said slots.

These and other objects of my invention will appear as the following specification proceeds, and with reference to the accompanying drawings, wherein:

Figure 2 is an enlarged fragmentary vertical sectional view taken transversely through the stay wire magazine and illustrating one form in which the guide and retaining means for the stay wires may be constructed;

Figure 3 is an enlarged fragmentary horizontal sectional view taken through the stay wire magazine with the guide and retaining means for the stay wires shown in horizontal section;

Figure 4 is a bottom view of the stay wire guide and retaining means;

Figure 5 is a transverse sectional view taken substantially along line 5—5 of Figure 4; and Figure 6 is a sectional view taken substantially along line 6—6 of Figure 2.

Figure 1:
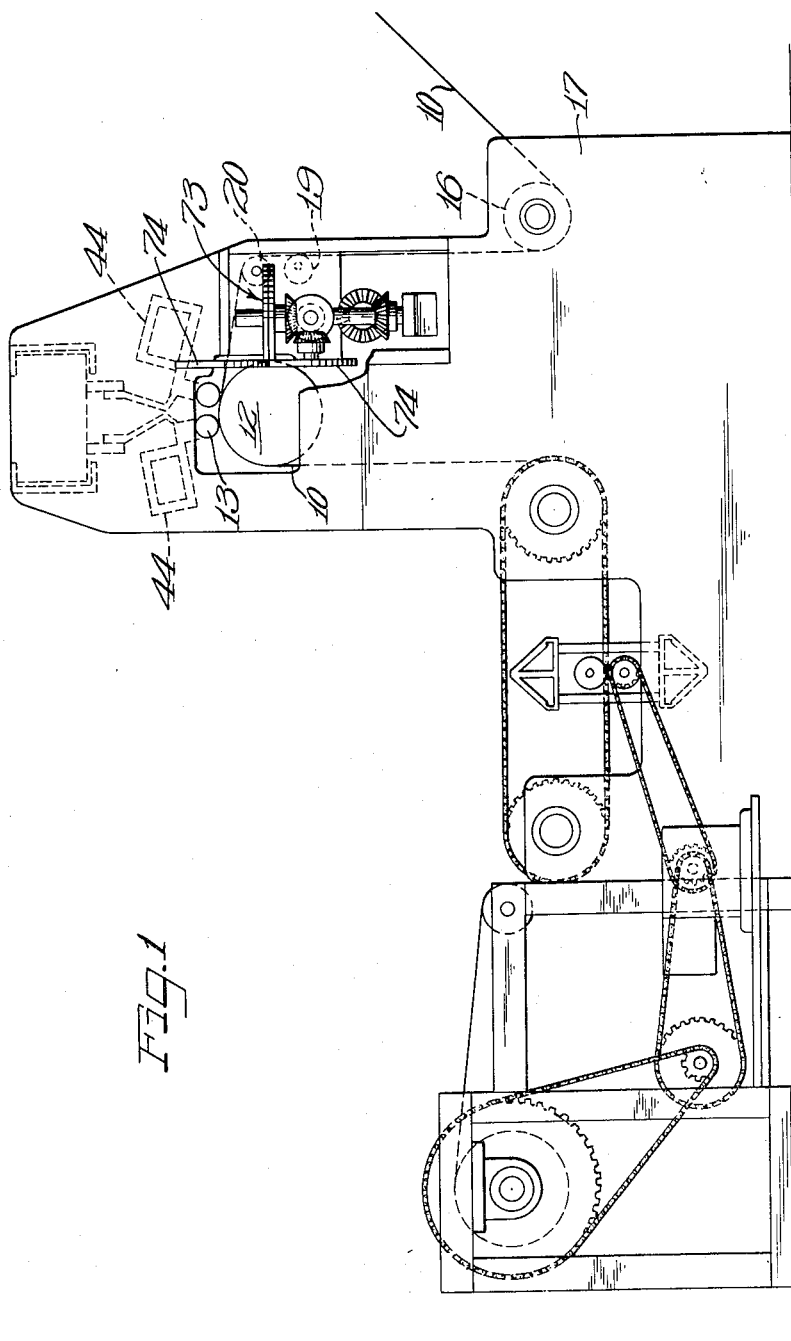
Figure 1 is a diagrammatic view in side elevation of a wire mesh fabricating machine having a stay wire retaining and guide means constructed in accordance with my invention embodied therein.

In the embodiment of my invention illustrated in the drawings, the reference numeral 10 indicates the line wires of the mesh, the number and spacing of which may vary in accordance with the nature of the fabric to be constructed. The line wires 10 are guided to pass over cross or stay wires 11, measured, cut and supplied to a rotating magazine 12 without interruption in rotation of said magazine, and pressed into engagement with said magazine by the line wires 10 and alternate laterally and circumferentially spaced rolling welding electrodes 13—13. The laterally spaced electrodes 13—13 alternately engage the line wires in advance of each other and hold them in engagement with the associated stay wires during welding, as shown in my application Serial No. 143,755, filed February 11, 1950, now Patent No. 2,712,837 issued July 12, 1955. The line wires are bonded with the cross wires by resistance welding, the drum itself serving as the other electrode for the welding operation, as in my aforementioned prior application.

The line wires 10—10 may be trained from individual spools or reels of wire (not shown) downwardly beneath a direction changing roller 16 mounted between side plates 17—17 of the welding machine. From thence the line wires 10—10 may be trained upwardly into engagement with a line wire slacker roller 19. The line wire slacker roller 19 is an eccentrically mounted roller, power driven in timed relation with respect to the feeding and welding operations, to slack the line wires immediately after each welding operation. From the slacker roller 19, the line wires 10 are trained upwardly around a direction changing roller 20 and inwardly therefrom to and through a plurality of laterally spaced tubular line wire guides 23 and 24 to the respective welding electrodes.

The tubular line wire guides 23 and 24 are best shown in Figure 2 and are similar to those shown and described in application Serial No. 212,337, filed by me on February 23, 1951, now abandoned, and entitled "Line Wire Guide Means for Welded Wire Mesh Fabricating Machines," so need not herein be described in detail. Said line wire guides are mounted between support and clamping blocks 25 and 26 and are shown as being clamped thereto by machine screws 27—27. The tubular guides 23 and 24 extend from said blocks along an upper inclined face of an angularly disposed transverse beam 29 having arcuate retaining ribs 30—30 extending inwardly therefrom within line wire receiving slots 34—34 of the welding magazine 12 and generally conforming to the form thereof. The ends of the tubular guides 23—23 are tapered to lay the associated line wires 10—10 on the stay wires 11—11 in direct alignment with peripheral grooves 35—35 formed in the welding electrodes 13—13.

In a like manner the tubular guide 24 extends along an alternate line wire slot 34 beyond the guide 23, and is curved to conform to the periphery of the magazine 12 and lay the next adjacent line wire on the stay wires 11—11 in direct alignment with the center of the next adjacent welding electrode 13. The alternate guide tubes 23 and 24 thus extend along the upper inclined face of the cross beam 29 and accurately lay the line wires on the stay wires in direct alignment with the centers of the respective welding electrodes 13—13, in the circumferential path of travel thereof. The inside diameter of the tubes 23 and 24 may be relatively small, but should be sufficiently large to permit the line wires to readily pass therethrough and to straighten and remove kinks from the line wires as they pass therethrough.

The lower clamping block 25 for the line wire guides 23 and 24 is herein shown as being mounted on the top of a cross frame member 36 secured at its inner end to the beam 29 and extending rearwardly therefrom and braced adjacent its outer end by a brace 37, extending between the side plates 17—17 and connected between the outer lower side of the cross beam 29 and the under side of the support member 36.

The rolling electrodes 13—13 may be made from a hard drawn copper, a material known to the trade as "Mallory Metal," or any other conductor suitable for resistance welding. Each of said electrodes is herein shown as having a hub 39 projecting from each side thereof and as having a shaft 40 extending therethrough. The shaft 40 is shown as being rotatably mounted at its ends on two parallel spaced arms 41—41 extending along opposite sides of the respective electrode. The arms 41—41 are pivotally mounted at their rear ends on a support leg 50 secured to and depending from the depending leg of a transverse bracket member 51 and extending from said bracket member toward the magazine 12. The bracket member 51 is in turn secured to an inclined vertical face of a box-like beam 44, secured between the frame members 17—17. Separate conductors 45—45 for each electrode are slidably mounted in guide slots 46—46 of guide members 47—47 secured to the brackets 51—51. The lower ends of the conductors 45—45 are bifurcated and have concave engaging ends conforming to and engaging the hubs 39—39 of electrodes 13—13. A compression spring 49 is shown as being seated at the outer end of each conductor 45 and yieldably engaging the associated electrode with its line wire.

The stay wire magazine 12 is constructed along lines similar to those shown in application Serial No. 143,755, filed by me on February 11, 1950. As best shown in Figure 3, the magazine 12 includes generally a plurality of spaced annular webs 53—53 secured to a transverse shaft 54 in spaced relation with respect thereto by welding, and having a cylindrical drum 55 welded to the outer periphery thereof. An annular retaining plate 56 is secured to the opposite end of the drum 55 from the stay wire feed rolls 57 and is secured thereto as by machine screws 58—58.

A plurality of flat annular rings 59—59 are keyed to and encircle the drum 55 in end-to-end relation and are interposed between the inner face of the retaining ring 56 and an opposite end ring 60. The ring 60 is also keyed to said drum and is clamped thereto to clamp the rings 59—59 to said drum, as by an end clamping ring 61. The ring 61 is secured to the opposite end of the drum from the ring 56 as by machine screws 63—63. The inner face of the end ring 56 and the adjacent faces of the rings 59—59 are shouldered and receive guide rings 64—64 therebetween in spaced relation with respect to each other. The spaces between the guide rings 64—64 form the circumferential line wire slots 34—34. The guide rings 64—64 are shown as having outwardly opening registering slots 65—65 extending entirely across the face of said drum for receiving the stay wires 11—11 and supplying said stay wires to the line wires 12—12.

The faces of the slots 65—65 facing the end ring 60 are beveled to permit the stay wires to readily enter said slots. The bottoms of said slots are shown as being in direct alignment with the top surface of the end ring 56, and with the top surface of annular segments 67—67. Said segments are shown as being suitably secured in the spaces between the guide rings 64—64 and form a bridge for the current between the rolling electrodes, for welding the line wires to the cross wires. Said annular segments may be made from the same material as the rolling electrodes 13—13 or from any other suitable material which may serve as a resistance welding electrode.

The end ring 61 is shown as having a plurality of spaced guide apertures 81—81 extending therethrough in direct alignment with the slots 65—65. The guide apertures 81—81 are herein shown as having converging entering surfaces, converging toward the apertures 81—81 to guide the wires thereto during rotative movement of said magazine.

The transverse shaft 54 is herein shown as being suitably journaled in bearing blocks 69—69, mounted on and extending inwardly from opposite side frame members 17—17 of the machine, on angle brackets 70—70. A spur gear 71 is shown as being secured to the outer end of the shaft 54. Said spur gear may be driven from the main motor for the machine (not shown) through a suitable gear train, in a manner similar to that shown in my application Serial No. 143,755, above mentioned, and not herein shown or described, since it forms no part of my present invention.

The stay wires 11—11 are shown as being measured, sheared and fed to the stay wire slots 65—65 of the magazine 12 without interruption in the rotation of said magazine by means of a flying shear 73. The flying shear 73 is like that shown and described in my aforementioned application Serial No. 143,755, so need not herein be shown or described in further detail.

As shown in Figure 1, power driven pinch rolls 74—74 engage and feed the wire to the shear 73, which is herein shown as being in the general form of a rotatable wheel having a knife (not shown) carried thereby and movable into engagement with the wire to shear the wire into stay wires of predetermined lengths, as in my aforesaid application Serial No. 143,755. At the discharge end of the shear 73 is a guide member 76 guiding the stay wires, cut to length, between the nips of the power driven stay wire feed rolls 57—57, which are preferably pinch rolls. Only one pinch roll 57 is herein shown, for the purpose of simplifying the drawings. The pinch rolls 57—57 are rotatable about horizontal axes and serve to positively pull and accelerate the sheared stay wires from the flying shear 73 and force said stay wires through a guide tube 80. The guide tube 80 is shown as having its center in direct alignment with the nip between the rolls 57—57 and also as being directly aligned with the centers of the guide apertures 81—81 formed in the end guide ring 60. The pinch rolls 74, 74, the shear 73 and the pinch rolls 57, 57 are driven in timed relation with respect to each other and with respect to the speed of travel of the drum 12 from a single motor (not shown); which also drives the drum 12. The drives are through geared drive connections as in my application Serial No. 143,755 previously mentioned and are not herein shown or described further, since the drive is no part of my present invention.

The stay wire is thus fed from a continuous reel of wire; measured and cut to length, and positively propelled in rapid succession in the stay wire slots 65—65 of the magazine 12 during rotation of said magazine.

In one machine constructed in accordance with my invention, each stay wire is 90 inches long, and as many as 100 stay wires have been successively fed to the stay wire receiving slots 65—65 of the magazine 12 in one minute.

Due to the high velocity at which the stay wires enter the stay wire slots 65—65, provision must be made to arrest this rapid travel of the stay wires and also to prevent the stay wires from rebounding from the slots 65—65 by the impact created when being arrested. An anvil 85 is herein shown as being provided for this purpose. As herein shown, the periphery of the end plate 56 slopes toward the shaft 54 in the form of an arc curving inwardly from the bottoms of the stay wire slots 65—65. The anvil 85 may be mounted on the cross beam 29 and is shown in Figure 3 as extending over the end ring 56 in alignment with the guide tube 80, and as having a sloping or curved inner face 86, spaced from the curved outer periphery of the end ring 56 and extending at a steeper angle than the angle of the slope of said end ring. The anvil 85 opens in direct alignment with the guide aperture 81 and the sloping face thereof is engaged by the end of the rapidly moving stay wire 11, and serves to bend the end of said wire to conform generally to the periphery of the end ring 56 as it arrests travel thereof. The bent end of the wire, conforming generally to the periphery of the ring 56, will thus retain the wire to said ring and prevent it from rebounding from the magazine, it being understood that the anvil 85, besides bending the end of the wire, also serves to decelerate the wire and positively stop the wire as its advance end reaches the outer end of the ring 56.

Referring now in particular to the guide and retaining means for the stay wires, as the latter are successively propelled by the pinch rolls 57—57 through the guide 80 and guide apertures 81—81 of the guide ring 60, a plurality of guide and retainer blocks 88—88 are shown as depending from the bottom of the cross beam 29 in end relation with respect to each other, and as being secured thereto as by machine screws 89—89 (see Figures 3 and 4).

Each retainer block 88 is shown as having a plurality of equally spaced upright ribs 90—90 extending inwardly from the inner vertical face of said block within the line wire slots 34 for a short portion of the depth thereof and also extending vertically therealong. Each rib 90 has an advance beveled face 91, serving to guide the stay wire to pass by the end of said rib. A plurality of guide fingers 93—93 extend along and are secured to the bottom of the retainer block 88 in direct alignment with the ribs 90—90. The retaining fingers 93—93 may have some flexibility, although they need not be flexible, and may be secured to the bottom of each block 88 as by machine screws 94—94.

Each retaining finger 93 extends inwardly along the bottom of the block 88 beneath and in alignment with an associated rib 90 and then turns upwardly within the associated slot 34, in parallel spaced relation with respect to said rib. Each retaining finger 93 has a beveled entering face 95 corresponding to the beveled face 91 but extending at an opposite angle from said face, and with said face forming a converging cross or line wire retaining guide extending vertically in direct alignment with the guide tube 80 and the guide apertures 81—81.

The stay wires are thus fed through the guide tube 80 and guide apertures 81 in direct alignment with the space between the outer edges of the ribs 90—90 and the inner edges of the retaining fingers 95—95 into the stay wire slots 65—65, adjacent the lower ends of said ribs and fingers and outwardly from the bottoms of said slots. Rotative movement of the magazine 12 will then successively move the stay wires upwardly along guides formed between said ribs and fingers into engagement with advance inwardly inclined faces 97—97 of the arcuate retaining ribs 30—30 (Figure 2). Engagement of the stay wires with the advance inclined faces 97—97 of the retaining ribs 30—30 during continued rotational movement or travel of the magazine 12 will thus move the stay wires inwardly along the slots 65—65 to the extreme bottoms thereof, in engagement with the electrode segments 67—67, and upwardly along the ribs 30—30 into engagement with the line wires 10—10.

As soon as the cross wires are engaged by the line wires, they will be retained within the slots by the line wires and will be pressed into engagement therewith by the rolling welding electrodes 13—13 for welding thereto, as has previously been described in my application Serial No. 143,755, and no part of my present invention so not further shown or described herein.

It may be seen from the foregoing that a simple but efficient feeding guide and retaining means for the stay wires has been provided, for positively feeding the stay wires to the rotating magazine without interruption in rotatable travel thereof and retaining the stay wires therein in a simpler and more positive manner than formerly.

It may further be seen that the stay wires are initially fed to the stay wire guide slots 65—65 at points spaced outwardly from the bottoms thereof out of contact with the segmental electrodes 67—67, so as to avoid interference therewith, and are retained in this position for a short part of their travel by the retaining fingers 93—93, and that as they leave said retaining fingers they are then forced inwardly along the slots 65—65 into engagement with the electrode segments 71—71.

It may still further be seen that the blocks 88—88 and the retaining fingers 93—93 carried thereby may be individually removed and replaced for cleaning and repair, or to clear fouled wires from the magazine in cases of accident.

It will also be apparent that a novel and improved means has been provided for arresting travel of the rapidly traveling stay wires and preventing the stay wires from jumping back out of the stay wire slots 65—65, by engaging the leading ends of the stay wires with an anvil and bending the ends thereof to conform to the outer periphery of the end ring 56, to retain said wires from rebounding from the stay wire slots.

It will be understood that modifications and variations may be effected without departing from the spirit and scope of the novel concepts of the present invention.

I claim as my invention:

1. In a welded wire mesh fabricating machine, a frame having a rotatably driven drum journaled thereon and comprising a stay wire magazine, said drum having a plurality of transverse stay wire carrying slots open to the ends and periphery thereof and also having intersecting circumferential line wire slots extending therearound, means for continuously rotating said magazine, feeding means at one end of said drum and driven in timed relation with respect to the speed of rotation of said drum for successively feeding stay wires endwise into said slots at a relatively high velocity, and an anvil at the opposite end of said magazine from said feeding means having a wire-engaging face engaged by the leading ends of the rapidly traveling stay wires and arresting travel thereof and also simultaneously bending the ends of the stay wires with respect to said drum upon engagement with said anvil, for holding the stay wires from rebounding from said drum.

2. In a welded wire mesh fabricating machine, a frame having a stay wire magazine journaled thereon comprising a drum having a plurality of transverse stay wire slots open to the periphery thereof and intersecting circumferential line wire slots extending therearound, means for rotatably driving said drum, feeding means driven in timed relation with respect to the speed of rotation of said drum for successively feeding stay wires endwise into said transverse slots, the end of said drum opposite said feeding means converging from the bottoms of said stay wire slots toward the axis of said drum, and a stationary anvil mounted on said frame and extending over said curved end of said drum and having an engaging surface facing said end plate of said drum and generally conforming to the form thereof and spaced outwardly therefrom for engagement with the ends of said stay wires, to arrest feeding movement thereof and at the same time bend the ends of said stay wires to conform generally to the form of said end plate and retain said stay wires from rebounding from said slots.

3. A welded wire mesh fabricating machine comprising a frame having a stay wire magazine journaled thereon comprising a drum having a plurality of transverse stay wire slots open to the periphery and opposite ends thereof and having intersecting circumferential line wire slots extending therearound, means for continuously rotating said magazine, an annular guide plate at one end of said drum having apertured stay wire guides extending therethrough in alignment with said stay wire slots and converging from the outer to the inner ends thereof, power driven pinch rolls the nip of which is in direct alignment with said stay wires guides and driven in timed relation with respect to the speed of rotation of said magazine, for projecting the stay wires through said guides and slots without interruption in the speed of travel of said magazine, an end plate for the end of said drum opposite said annular guide plate and extending outwardly and curving inwardly toward the axis of said drum from the bottoms of said cross wire slots, and an anvil on said frame extending over said end plate in direct alignment with said apertured stay wire guide and having an engaging surface facing said inwardly curving surface of said end plate and spaced radially therefrom and converging toward said inwardly curving surface as it extends outwardly therealong, said surface being in position to be engaged by the rapidly moving stay wires and arresting movement thereof and bending the ends thereof to conform generally to the form of the inwardly curving surface of said end plate, to retain said stay wires from rebounding from said slots.

4. In a stay wire guide and retaining means for wire mesh fabricating machines including a rotating magazine having a plurality of uniformly spaced stay wire slots extending transversely thereof and opening to the periphery and ends thereof and also having a plurality of line wire slots extending circumferentially therearound and intersecting said stay wire slots, feeding means at one end of said magazine disposed in a horizontal plane substantially intersecting the axis thereof and driven in timed relation with respect to the speed of rotation of said magazine, and guide means extending from said feeding means in alignment with said stay wire slots for guiding the stay wires into said slots at points spaced radially from the bottoms thereof, a stationary support extending along said magazine, and a plurality of retaining fingers on said support spaced therefrom and extending vertically within said line wire slots in parallel spaced relation with respect to said support and in alignment with said guide means and initially retaining said stay wires within said slots at points spaced radially from the bottoms thereof.

5. In a wire mesh welding machine, a continuously rotating magazine, a pair of power driven pinch rolls rotating in timed relation with respect to the speed of rotation of said magazine for projecting stay wires to said magazine, means for initially retaining the stay wires on said rotating magazine, said magazine having a plurality of uniformly spaced stay wire slots extending transversely thereof and opening to the periphery and ends thereof, and also having a plurality of line wire slots extending circumferentially thereof and intersecting said stay wire slots, a support extending horizontally along said magazine beneath the top thereof, a guide and retainer block depending from said support in close proximity to said magazine and having a plurality of spaced retaining ribs extending vertically within said circumferential slots, and retaining fingers secured to said block and extending upwardly along said ribs within said circumferential slots in parallel spaced relation with respect to said retaining ribs, the space between said ribs and fingers forming stay wire guide retaining means retaining the stay wires within said transverse slots at points spaced radially from the bottoms thereof during initial feeding movement of said stay wires for welding to the line wires.

6. In a wire mesh fabricating machine, a rotatable stay wire magazine having a plurality of transverse stay wire slots and circumferential intersecting line wire slots, feeding means at one end of said magazine comprising a pair of pinch rolls driven in timed relation with respect to the speed of rotation of said magazine for successively feeding stay wires to said slots during rotation of said magazine, and retaining means for said stay wires extending along said magazine in alignment with said feeding means comprising a horizontal support extending along said magazine, a plurality of guide and retainer blocks mounted on said support in end to end relation with respect to each other for ready removal therefrom and having guide and retaining ribs extending within said circumferential slots and retaining fingers secured thereto and extending within said circumferential slots in parallel spaced relation with respect to said ribs.

7. In a machine for fabricating welded wire mesh consisting of a plurality of uniformly spaced stay wires having a plurality of parallel spaced line wires welded thereto, a frame, a stay wire magazine journaled in said frame and having a plurality of stay wire slots extending thereacross and a plurality of circumferential line wire slots intersecting said stay wire slots, means for rotatably driving said magazine, a plurality of laterally spaced rolling electrodes extending within said circumferential slots for engaging the line wires with the stay wires and welding the line wires thereto, means guiding the line wires to said rolling electrodes, stay wire feeding and guide means at one end of said magazine in alignment with said stay wire slots and including a pair of power driven pinch rolls rotating in timed relation with respect to the speed of rotation of said magazine, means initially retaining said stay wires within said stay wire slots and during travel thereof into engagement with said line wires, including a horizontal support extending along said magazine beneath the top thereof and having a plurality of spaced ribs extending within and vertically along said circumferential slots and retaining fingers secured thereto and extending upwardly within said circumferential slots in parallel spaced relation with respect to said ribs, and means for arresting travel of said stay wires during insertion thereof between said ribs and fingers and preventing said stay wires from rebounding from said fingers, including a stationary anvil extending along the opposite side of said magazine from said pinch rolls and in substantial alignment therewith, and having an inwardly turned engaging surface engaged by the leading ends of the stay wires for arresting travel thereof and for bending inwardly the ends thereof.

References Cited in the file of this patent
UNITED STATES PATENTS

| | | |
|---|---|---|
| 1,175,516 | French | Mar. 14, 1916 |
| 1,367,212 | Southwick | Feb. 1, 1921 |
| 1,915,184 | Cosgrove | June 20, 1933 |
| 2,046,461 | Johnson | July 7, 1936 |
| 2,294,369 | Harter | Sept. 1, 1942 |
| 2,390,174 | Roemer | Dec. 4, 1945 |
| 2,405,257 | Kehrer | Aug. 6, 1946 |
| 2,410,766 | Wickwire | Nov. 5, 1946 |
| 2,487,392 | Southwick | Nov. 8, 1949 |